ated.
UNITED STATES PATENT OFFICE.

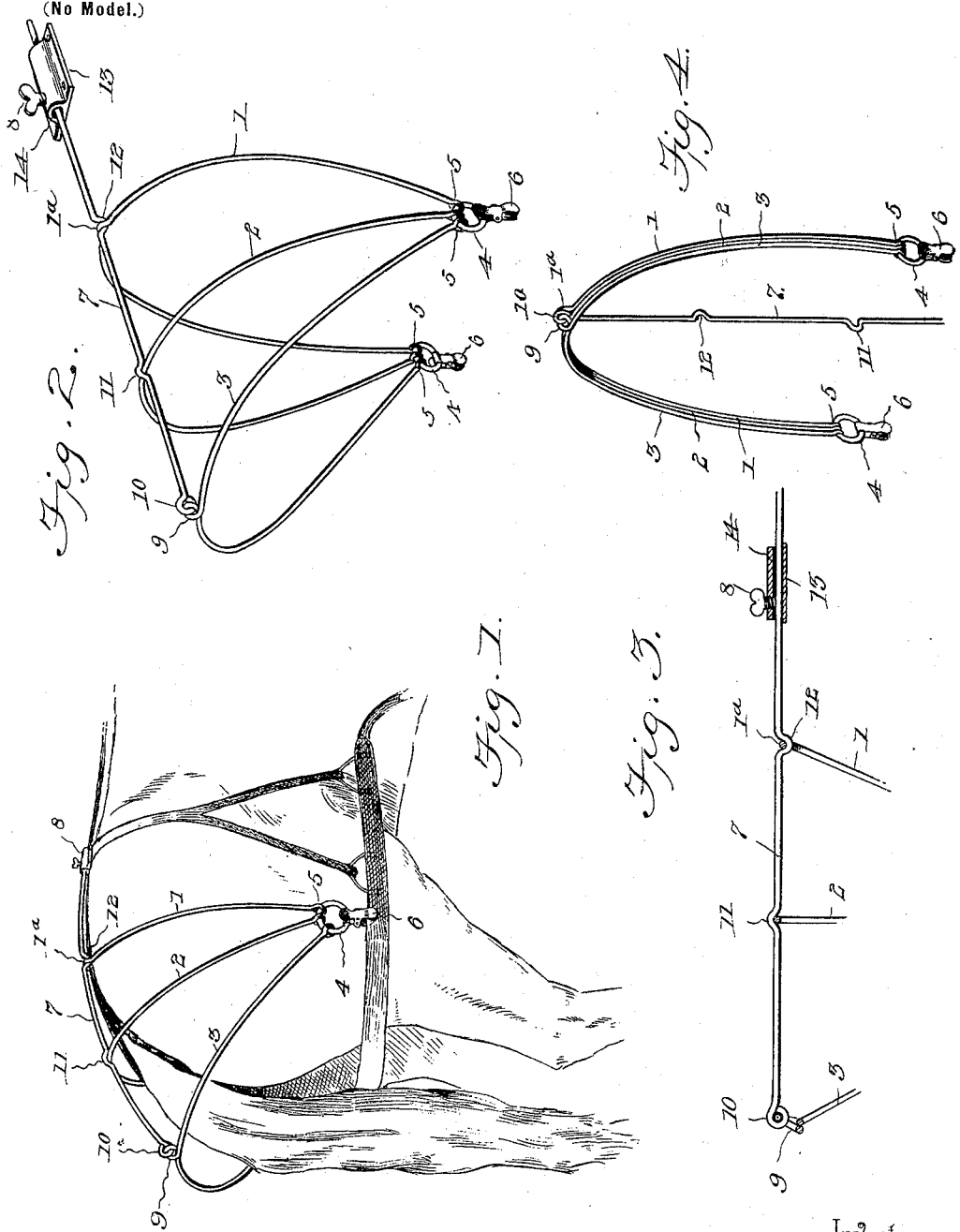

FRANK LEWIS CAMPBELL, OF PULASKI, VIRGINIA, ASSIGNOR OF ONE-THIRD TO R. J. CRAWFORD, OF SAME PLACE.

REIN-SHIELD.

SPECIFICATION forming part of Letters Patent No. 610,797, dated September 13, 1898.

Application filed October 6, 1897. Serial No. 654,235. (No model.)

*To all whom it may concern:*

Be it known that I, FRANK LEWIS CAMPBELL, a citizen of the United States, residing at Pulaski, in the county of Pulaski and State of Virginia, have invented a new and useful Rein-Shield, of which the following is a specification.

My invention relates to improvements in rein-fenders designed to be attached to and worn on the harness to prevent the horse's tail from catching in the driving-reins; and the primary object of the present improvement is to provide an improved fender or shield which is capable of folding compactly, so as to occupy a minimum space when the harness is removed from the horse and hung on a rack or peg.

A further object of the invention is to provide an improved construction of the fender which provides for its ready application to a harness and which serves as a lock for confining the component parts of the fender in the spread or opened positions while the device is in service.

A further object that I have in view is to simplify the construction and render it cheap of manufacture and efficient and reliable in service.

To the accomplishment of these ends the first part of my invention consists of a collapsible or foldable fender and means for locking the component parts of the fender in its spread condition.

The invention further consists in a sectional fender having its members attached to suitable rings or the like, a locking-bar adapted to be operatively connected with the fender members to hold the same in their opened or spread condition, and a clamp for said locking-bar; and the invention further consists in the novel combination of devices and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a perspective view showing my improved fender or shield applied to a harness in operative position. Fig. 2 is a perspective view of the fender detached from the harness. Fig. 3 is a longitudinal sectional view taken through the fender and its locking device. Fig. 4 is a perspective view showing the fender in its collapsed or folded condition.

Like numerals of reference denote corresponding parts in all the figures of the drawings.

My improved fender consists of the members 1, 2, and 3, although the number of sections is not material. Each member or section consists of a length of stout wire, preferably of an elastic nature, bent to the curved or arched form shown by the drawings, and the ends of the members or sections are loosely connected to attaching devices. As shown by the drawings, I employ rings 4 4 and provide the members with loops or eyes 5, which fit around the rings and are loosely connected thereto, and to these rings 4 are connected the fasteners 6, by which the fender may be connected to the breeching of a harness. I do not desire, however, to restrict myself to the employment of the fasteners 6 as the means for connecting the fender to a harness-breeching, because I am aware that snap-hooks may be employed to connect the eye-formed ends of the fender members and to attach the fender to a loop on a harness-breeching. The fasteners 6 shown by the drawings are advantageous, however, in that they provide means for adjustably attaching the fender at different points on the breeching, so that the fender may be moved or adjusted to different positions, as may be required in the practical application or service of the fender.

The members of the fender being loosely connected to the rings or attaching devices 4, they are adapted to fold together in order to collapse the fender, as shown by Fig. 4, and thus the fender is adapted to fold with the harness when it is removed from the horse and hung on a peg or rack. In order to hold the fender in its opened or spread condition, I resort to the employment of a locking contrivance to engage with the fender members and to hold them steadily and firmly in position. This locking contrivance in the embodiment of the invention shown by the drawings consists of a rod or wire 7 and a clamp therefor. The rear member or section 3 of the fender is provided with an eye 9, formed, preferably, by bending or looping the wire upon itself, and with this eye or loop 9 engages the loop 10 on the rear end of the locking-rod 7. This locking-rod 7 is adapted to be passed over the central member 2 of the fender and beneath the front fender member 1, and said rod is constructed for interlocking engagement with said fender members 1 2 to hold them securely in position when opened. To attain this end the rod 7 is offset at 11 at the point where it passes over the middle fender member 2, and in advance of this offset 11 the rod is provided with the seat 12, into which is fitted the offset 1ª, provided in the front fender member 1. It will be observed that the locking-rod is loosely attached to the rear member 3, passes over the middle member and beneath the front member, and that said rod is adapted to be interlocked with the members 1 2 and to be held in engagement therewith by the elasticity or spring in the arched members of the fender. The described construction of the fender and the locking-rod is advantageous in that the members of the fender are held firmly in place when opened or spread for service; but when the harness is removed from the horse the rod may be disconnected from the members 1 2 to allow the members to fold together and the rod to fold alongside of the collapsed fender, thus causing the fender to occupy a minimum amount of space when the harness is removed and suspended.

To sustain the fender in position over a horse's rump, I provide means for fastening the locking-rod 7 to a part of the harness, preferably to the back-band thereof, and this fastening means for the locking-rod enables said rod to be adjusted or moved endwise for the purpose of holding the fender to the required position on horses of different sizes. I prefer to employ a plate 13, provided with a longitudinal socket 14, which parts are made integral one with the other by casting them together; but the detailed construction of the plate and its tube or socket is not material. The plate is provided with apertures 15, through which may be passed suitable fasteners to attach the plate to the harness—as, for instance, by rivets. This plate is fastened to the back-band of the harness at a suitable distance in front of the crupper, and the front end of the locking-rod is fitted in the tube or socket 14, to be held firmly therein by a clamp, one part of which clamp is formed by the tube 14 and the other part by a movable element consisting preferably, though not essentially, of a screw 8, which is fitted in a threaded opening of the tube and is adapted to bind on the rod 7 to hold the latter in place and thus sustain the members of the fender in their spread or opened positions and to also sustain the fender itself in the required position over the horse's rump to prevent the lines or reins from being caught in the animal's tail when switching the same.

To apply my improved fender to a harness, it is only necessary to fasten the plate 13 to the back-band and to connect the rings by the fasteners 7 to the breeching of the harness, after which the front end of the locking-rod is inserted in the tube 14 and the clamping-screw 8 is tightened. The rod engages with the individual members of the fender to hold them in their spread positions, and the fender itself is held in the proper position over the horse. The position of the fender may be changed by adjusting the rod in the clamp or holder or by attaching the fasteners 6 to the harness-breeching at different points, as may be required. When the harness is to be removed, the clamping-screw 8 is released, the rod 7 withdrawn from the tube and clamp and disengaged from the members 1 2, and said rod is then folded alongside of the fender, the members of which are free to collapse or fold together. The fender thus folds with the harness to enable the latter to be conveniently hung up on a rack, and thus the fender is readily adjusted to allow it to remain attached to the harness in condition for service.

From the foregoing description it will be evident that the fender does not materially interfere with the movement of the horse's tail when it is switched, that it is easily attached and detached, and that it embodies as a part thereof devices for locking the fender members rigidly in their unfolded or spread condition. The fender may be raised or lowered, as desired, and it affords an efficient means to prevent the reins from being caught in or entangled with the animal's tail.

The members of the fender may be of light steel springs or wire, and an ornamental screw may be used.

I am aware that changes in the form and proportion of parts and in the details of construction may be made without departing from the spirit or sacrificing the advantages of my invention, and I therefore reserve the right to make such modifications and alterations as fairly fall within the scope of the invention.

Having thus fully described my invention, what I claim as new, and desire to secure by Letters Patent, is—

1. A collapsible fender comprising a series of foldable members suitably connected to attaching devices, a rod attached to one member and provided with loops and arranged to fit over one member and beneath another member to be held in interlocking engagement with said members by the elasticity of said parts, and means for firmly holding the rod in place and the part on which the rod is firmly held, substantially as described.

2. The combination with a breeching and back-strap of a harness, of a collapsible fender having a series of bow-shaped members loosely attached at a common point to the breeching and arranged to fold in a compact relation to each other, and a locking device loosely connected with one member of the fender and detachably attached to the other fender members and to the back-strap of a harness, substantially as described.

3. A collapsible fender comprising suitable attaching means, a series of bowed members loosely connected to said attaching means and adapted to fold into compact relation to the other members, and a locking-rod arranged to be firmly interlocked with the individual members of the fender, substantially as described.

4. A collapsible rein-fender comprising a series of bowed members or sections connected to a common attaching device adapted for connection with a harness, a locking-rod arranged centrally across said members and detachably connected thereto, and suitable holding means for maintaining the locking-rod in a fixed position, substantially as described.

5. The combination with a harness, of a foldable fender having its bowed members loosely attached to a part of the harness, a rod having interlocking engagement with the individual fender members, and a clamp mounted on the harness and engaging with the rod, substantially as described.

6. A rein-fender comprising suitable rings or loops, fender members connected with said rings or loops, a locking-rod attached to one member and adapted to be interlocked with the other members, and a clamp secured to the harness and engaging with said rod, substantially as described, for the purposes set forth.

7. The combination with a sectional fender, of a rod connected pivotally to one fender member and having interlocking engagement individually with the other fender members, a suitable supporting-plate having a socket for the rod, and a clamping device carried by said plate and engaging with said rod, for the purposes described, substantially as set forth.

8. A collapsible fender comprising the members connected to enable them to fold together and with the front member provided with an offset, a locking-rod connected to the rear member and provided with an offset and with a seat for the intermediate and front members of said fender, and a holder or clamp with which said rod is adapted to engage, substantially as described.

In testimony that I claim the foregoing as my own I have hereto affixed my signature in the presence of two witnesses.

FRANK LEWIS CAMPBELL.

Witnesses:
I. T. BOCOCK,
WM. H. DAVIS.